United States Patent [19]

Lagrange et al.

[11] Patent Number: 6,094,606
[45] Date of Patent: *Jul. 25, 2000

[54] CONTROL PROCESS AND DEVICE FOR TREATING THE SURFACE OF A SOLID SUBSTRATE

[75] Inventors: Gilles Lagrange, Forges les Bains; Isabelle Hibon, Le Chesnay, both of France

[73] Assignee: L'Air Liquide Societe Anonyme pour l'Etude et l'Exploitation des Procedes Georges Claude, Paris, France

[ * ] Notice: This patent is subject to a terminal disclaimer.

[21] Appl. No.: 08/882,334

[22] Filed: Jun. 25, 1997

[30] Foreign Application Priority Data

Jul. 23, 1996 [FR] France ................................. 96 09234

[51] Int. Cl.[7] .................................................. G05D 13/00
[52] U.S. Cl. .......................... 700/304; 700/160; 700/122; 700/207; 700/204; 700/205; 700/222; 700/492; 700/287; 700/433; 700/434; 700/435; 700/439; 205/918
[58] Field of Search ............................ 34/492, 287, 433; 205/918; 700/304, 122, 207, 160, 95, 148, 150, 180, 175, 192, 204, 205, 222, 402, 404, 432, 434, 435, 439, 443

[56] References Cited

U.S. PATENT DOCUMENTS

| | | | |
|---|---|---|---|
| 4,512,772 | 4/1985 | Mitter | 8/477 |
| 4,946,568 | 8/1990 | Kalwar et al. | 204/164 |
| 5,527,629 | 6/1996 | Gastiger et al. | 428/688 |
| 5,685,955 | 11/1997 | Leigraj et al. | 700/122 |
| 5,711,147 | 1/1998 | Vogtlin et al. | 423/213.7 |
| 5,763,892 | 6/1998 | Kizaki et al. | 250/492.1 |
| 5,891,409 | 3/1999 | Hsiao et al. | 423/239.1 |
| 5,953,230 | 9/1999 | Moore | 700/122 |
| 6,016,751 | 1/2000 | Hess | 700/122 |

FOREIGN PATENT DOCUMENTS

| | | |
|---|---|---|
| 129199 | 12/1984 | European Pat. Off. . |
| 248274 | 12/1987 | European Pat. Off. . |
| WO92/11312 | 9/1992 | European Pat. Off. . |
| 658416 | 6/1996 | European Pat. Off. . |

OTHER PUBLICATIONS

Sugita et al., "Vacuum Deposition of Co=Cr Perpendicular Anisotropy Films on Polymer Substrates Treated with lon Beam", IEEE, pp. 4183–4185, vol. 25Sugita et al., Vacuum Deposition of Co=Cr Perpendicular Anisotropy Films on Polymer Substrates Treated wit, May 1989.

(List continued on next page.)

*Primary Examiner*—William Grant
*Assistant Examiner*—McDieunel Marc
*Attorney, Agent, or Firm*—Burns, Doane, Swecker & Mathis, LLP

[57] ABSTRACT

A control device for operation of a system for treating a surface of a solid running substrate by dielectric-barrier electrical discharge in a controlled gaseous atmosphere, comprising (A) a system which includes (i) a treatment device through which a substrate to be treated runs at a speed, (ii) the system is connected to the treatment device for supplying the treatment device with gas, (iii) the system is connected to the device for supplying the treatment device with electrical power in order to produce the electrical discharge and (iv) the system for sucking out the gas (B) a data processing unit designed to receive, as input, a datum regarding the speed at which the substrate is running through the treatment device, the data processing unit being connected, on the output side, to the gas supply system, to the electrical power supply system and to the gas suction system, in order: (a) upon starting the treatment device and when the running speed of the substrate is greater than a predetermined speed, to carry out the following actions: initiate operation of the suction system, initiate operation of the gas supply system, initiate operation of the electrical power supply system, and (b) upon stopping the device and/or when the running speed of the substrate drops to a level below a predetermined speed to carry out the following actions: interrupt operation of the electrical power supply system, interrupt operation of the gas supply system, and interrupt operation of the suction system.

14 Claims, 1 Drawing Sheet

OTHER PUBLICATIONS

Yumoto et al., (Surface processing of PTFE by electrical discharge . . . ), IEEE, pp. 389–392, 1992.

Haidara et al., (Electron multiplication in liquid . . . ), IEEE, pp. 592–597, Aug. 1991.

Lehtio et al., (Recognition of of electrical discharge . . . ), IEEE, pp. 370–375, Oct. 1992.

Hsiao et al., (Pulse corona and dielectric–Barrier discharge . . . ), IEEE, pp. 270, Jun. 5–8, 1995.

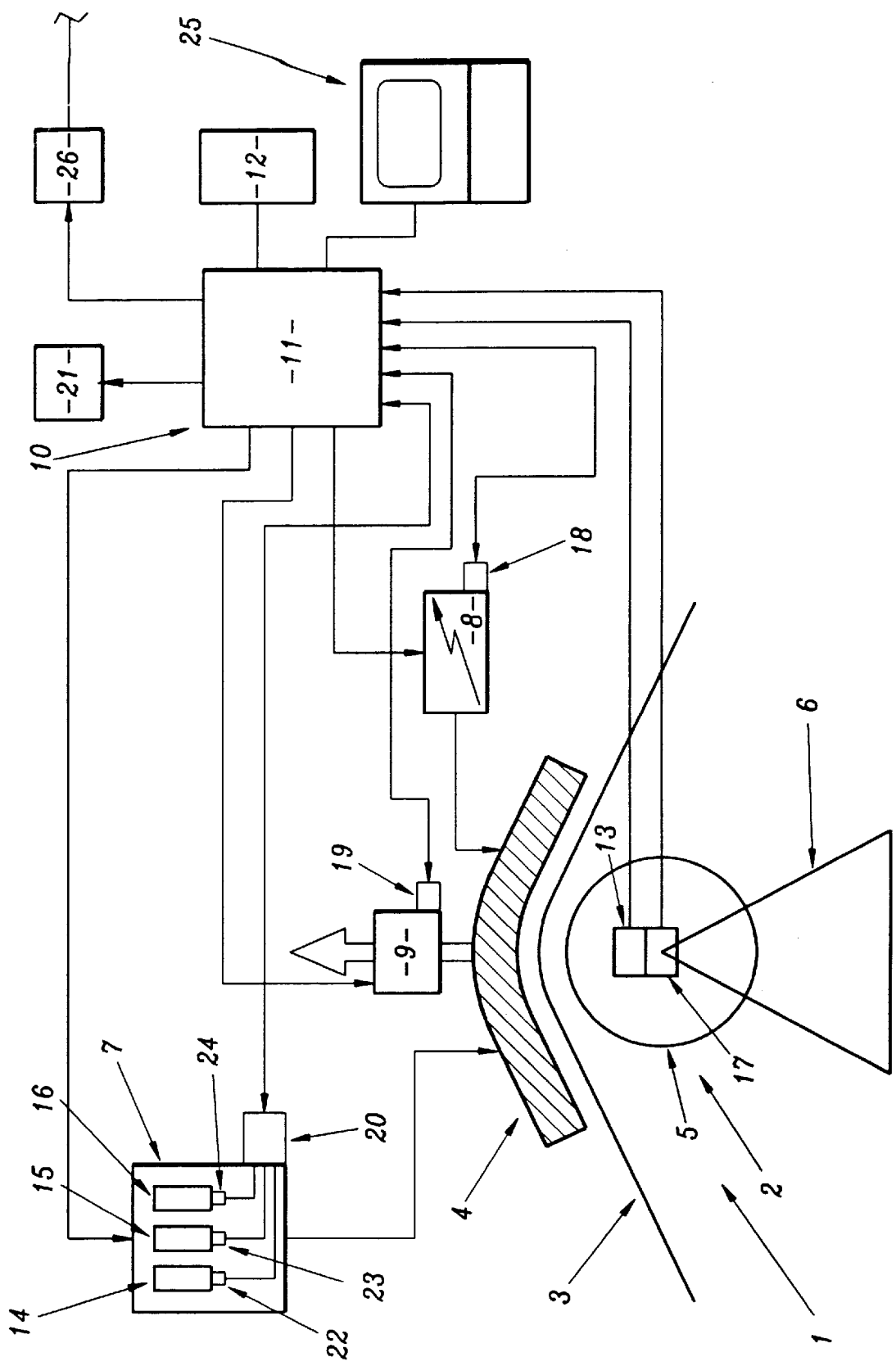

CONTROL PROCESS AND DEVICE FOR TREATING THE SURFACE OF A SOLID SUBSTRATE

BACKGROUND OF THE INVENTION

1. Field of the Invention

The present invention relates to a control device for the operation of a system for treating the surface of a solid running substrate by dielectric-barrier electrical discharge in a controlled gaseous atmosphere.

By way of illustration, the following application examples may be mentioned: the treatment of polymer films for food packaging or the manufacture of capacitors.

2. Description of the Related Art

Already known in the prior art, for example from the document in the name of E. Prinz which appeared in "Plastics Southern Africa" in June 1983, pages 50 et seq., are surface treatment systems of this type which include a treatment device through which the substrate to be treated runs, this device being connected to means for supplying the treatment device with gas, to means for supplying the latter with electrical power in order to produce the electrical discharge and to gas suction means.

Such systems enable substrates to be treated in order to improve their properties, especially those of adhesion, of wettability and of gas impermeability, thereby enabling their fields of application to be extended.

Thus it has already been proposed, by the document EP-516,804 in the name of the Applicant, to deposit a thin layer of silicon oxide bonded to a substrate made of a polymer material, which comprises subjecting one surface of the substrate to a dielectric-barrier electrical discharge and exposing this surface to an atmosphere containing a silane, by virtue of which a deposition of silicon oxide, bonded to the surface of the substrate, is formed.

The treatment devices for implementing this type of process are generally integrated into a line for the continuous production or conversion of substrates (these conversion operations possibly including, for example, metallizing, inking or laminating operations) and these devices are regulated, for example, using a preestablished recipe as a function of this production/conversion line.

However, it will be appreciated that the operational control of such a treatment system, and in particular the operational control of gases of this type, may have a number of problems associated with possible poor coordination of the management, especially from a safety standpoint, of the operation of such a system.

SUMMARY AND OBJECTS OF THE INVENTION

The object of the invention is therefore to solve these problems.

For this purpose, the subject of the invention is a control device for the operation of a system for treating the surface of a solid running substrate by dielectric-barrier electrical discharge in a controlled gaseous atmosphere, the system being of the type which includes a treatment device through which the substrate to be treated runs, this treatment device being connected to means for supplying the treatment device with gas, to means for supplying the latter with electrical power in order to produce the electrical discharge and to means for sucking out the gases, being characterized in that it includes a data processing unit designed to receive, as input, a datum regarding the speed at which the substrate is running through the treatment device, the data processing unit being connected, on the output side, to the gas supply means, to the electrical power supply means and to the gas suction means, in order:

a) upon starting the treatment device and when the running speed of the substrate is greater than a predetermined speed, to carry out the following actions:
initiate the operation of the suction means,
initiate the operation of the gas supply means,
initiate the operation of the electrical power supply means, and b) upon stopping the device and/or when the running speed of the substrate drops to a level below a predetermined speed, to carry out the following actions:
interrupt the operation of the electrical power supply means,
interrupt the operation of the gas supply means and,
interrupt the operation of the suction means.

Advantageously, in case a), of starting the device, the actions are carried out in the following chronological order:
1) initiate the operation of the suction means,
2) initiate the operation of the gas supply means,
3) initiate the operation of the electrical power supply means.

Advantageously, in case b), of stopping the device and/or of being in the situation in which the running speed of the device has fallen to a level below a predetermined speed, the actions are carried out in the following chronological order:
1) interrupt the operation of the electrical power supply means,
2) interrupt the operation of the gas supply means and,
3) interrupt the operation of the suction means.

The "predetermined speed" according to the invention may be identical for case a) and case b), or else be different in the two cases.

As will be clearly apparent to those skilled in the art, the predetermined speed involved in situation a) and/or b) is established case by case, depending on the operating conditions of each user site, for example by taking into account at least one of the following methods:
using the minimum speed below which the treatment of the substrate is not satisfactory;
using the minimum speed below which there is a risk of degradation of the substrate (time during which the substrate is in contact with the discharge), this speed especially depending on the nature of the substrate.

Depending on the circumstances, it will therefore be understood that the "initiations" or "interruptions" involved in situation a) or situation b) may be immediate or virtually immediate (therefore with a very low predetermined speed level in case a), or in case b), very close to the running speed which the system has adopted before stopping.

According to one of the embodiments of the invention, the gas supply means comprise reducing-gas supply means and carrier-gas and oxidizing-gas supply means and in that the data processing unit, when the operation of these gas supply means is initiated, is designed to initiate the operation of the carrier-gas and oxidizing-gas supply means followed by that of the reducing-gas supply means and, when the operation of these gas supply means is interrupted, is designed to interrupt the operation of the reducing-gas supply means followed by that of the carrier-gas and oxidizing-gas supply means.

The invention will be more clearly understood on reading the description which follows, given solely by way of example and with reference to the appended drawing.

BRIEF DESCRIPTION OF THE DRAWING

The FIGURE represents a schematic diagram illustrating the structure and the operation of a control according to the invention.

DETAILED DESCRIPTION OF PREFERRED EMBODIMENTS

Recognizable in this FIGURE is, in fact, a control device for the operation of a system for treating the surface of a solid running substrate by dielectric-barrier electrical discharge in a controlled gaseous atmosphere.

For further teaching with regard to this treatment process, reference may be made to the aforementioned prior document (EP-516,804).

In this FIGURE, the treatment system is denoted in a general way by the reference 1 and it includes a treatment device, denoted by the general reference 2, through which the substrate to be treated runs.

This substrate is denoted by the general reference 3 and is, for example, in the form of a film designed to run through the treatment device between a stationary part 4 of the latter and a rotating part 5 of the latter, these being placed on support means 6 (it will be understood that the part 4 is stationary during the treatment phase, the system being usually mounted on jacks enabling it to be raised and lowered during other phases).

Such a treatment device, and more particularly the stationary part 4 of the treatment device, is connected to means for supplying the latter with gas, these being denoted by the general reference 7, to means for supplying the latter with electrical power, denoted by the general reference 8, in order to produce the electrical discharge and to gas suction means denoted by the general reference 9.

According to the invention, the control device includes a data processing unit, denoted by the general reference 10 in this FIGURE, which includes any suitable computer associated with data storage means, the computer being denoted by the general reference 11 in this FIGURE, while the storage means are denoted by the general reference 12.

This data processing unit 10 receives, as input, a datum regarding the speed at which the substrate is running through the treatment device from, for example, a speed sensor 13 associated, for example, with the rotating part 5 of the treatment device.

Moreover, the data processing unit 10 is connected, on the output side, to the gas supply means 7, to the electrical power supply means 8 and to the suction means 9 in order, upon starting the treatment device and when the speed at which the substrate is running through the device is greater than a predetermined speed, to carry out, for example in succession, the following actions:

1) initiate the operation of the suction means 9,
2) initiate the operation of the gas supply means 7 and
3) initiate the operation of the electrical power supply means 8.

In addition, upon stopping the treatment device and/or when the running speed of the substrate drops to a level below a predetermined speed, the data processing unit is, for example, designed for successively:

1) interrupting the operation of the electrical power supply means 8,
2) interrupting the operation of the gas supply means 7 and
3) interrupting the operation of the suction means 9.

It may also be observed in this FIGURE that the gas supply means 7 may include means for supplying a reducing gas, such as silane, these means being denoted by the general reference 14 in this FIGURE, and means for supplying a carrier gas and an oxidizing gas, these means being denoted, for example, by the references 15 and 16 respectively.

In this case, upon initiating the operation of these gas supply means 7, the data processing unit 10 is designed, for example, to initiate the operation of the carrier-gas and oxidizing-gas supply means 15, 16 followed by that of the reducing-gas supply means 14 and, upon interrupting the operation of these gas supply means, is designed to interrupt the operation of the reducing-gas supply means 14 followed by that of the carrier-gas and oxidizing-gas supply means 15, 16 respectively.

It will therefore be appreciated that this data processing unit enables a particular procedure for controlling the various means of the treatment system to be implemented, thereby making it possible to prevent or solve any problems which might result from poor coordination of the management thereof.

Moreover, this data processing unit 10 may also be connected to state sensors and/or to operational actuators of the treatment system in order to allow monitoring/control of the operation of the latter.

These various sensors and/or actuators are, for example, denoted by the general reference 17 in respect of the treatment device 2, 18 in respect of the electrical power supply means 8, 19 in respect of the suction means 9, and 20 in respect of the gas supply means 7.

By way of illustration, these state sensors may, for example, consist of treatment-gas flow metres, of pressure sensors or of suction rate sensors.

It will be noted, for example, that these means 20 associated with the gas supply means 7 may also be associated with means such as state sensors of the various gas supply means of the device in order to initiate the operation of alarm means 21, connected to the data processing unit 10, in the event of these malfunctioning.

Thus, for example, the reducing-gas supply means 14 may be associated with a detector 22, while the carriergas and oxidizing-gas supply means 15, 16 respectively may be associated with detectors 23 and 24 respectively.

These detectors comprise, for example, devices that detect a supply fault in these means in order to generate an alarm making it possible to attract the attention of anyone operating the system or else to a system for the remote control/monitoring of the system.

A corresponding supply fault datum may also be generated and used in order to switch, for example, from a main gas supply source to an auxiliary or emergency supply source.

Finally, the data processing unit 10 may also be connected to a man/machine interface 25 consisting of any appropriate computer terminal and may also be linked to a centre for the remote control/monitoring of the treatment system by means of data transmission means 26 of an appropriate type.

The supply fault datum may also be transmitted to this centre for the remote control/monitoring of the system via these data transmission means 26 and the data processing unit 10.

Initiation and interruption of the operation of the corresponding means of the treatment system depend, of course, on the nature of the latter.

Thus, for example, the gas supply means may be associated with electrically controlled output valves controlled by the data processing unit, while the suction means and the electrical power supply means may, for example, be turned on or off by this unit.

What is claimed is:

1. A control device for operation of a system for treating a surface of a solid running substrate by dielectric-barrier electrical discharge in controlled gaseous atmosphere, comprising
   (A) A system which includes (i) a treatement device through which a subsrate to be treated runs at a speed, (ii) means connected to said treatment device for supplying the treatment device with gas, (iii) means connected to said treatment device for supplying the treatment device with electrical power in order to produce the electrical discharge and (iv) means for sucking out the gas,
   (B) a data processing unit designed to receive, as input, a datum regarding the speed at which the substrate is running through the treatment device, the data processing unit being connected, on the output side, to the gas supply means, to the electrical power supply means and to the gas suction means, in order:
      a) upon starting the treatment device and when the running speed of the substrate is greater than a predetermined speed, to carry out the following actions:
         initiate operation of the suction means,
         initiate operation of the gas supply means,
         initiate operation of the electrical supply means, and
      b) upon stopping the device and/or when the running speed of the substrate drops to a level below a predetermined speed while the substrate is being treated, to carry out the following actions:
         interrupt operation of the electrical power supply means,
         interrupt operation of the gas supply means and,
         interrupt operation of the suction means.

2. The control device according to claim 1, wherein the data processing unit, in case a), carries out said actions in the following chronological order:
   1) initiate operation of the suction means,
   2) initiate operation of the gas supply means,
   3) initiate operation of the electrical power supply means.

3. The control device according to claim 1, wherein the data processing unit, in case b), carries out said actions in the following chronological order:
   1) interrupt operation of the electrical power supply means,
   2) interrupt operation of the gas supply means and,
   3) interrupt operation of the suction means.

4. The control device according to claim 1, wherein the gas supply means comprise means for supplying a reducing-gas and means for supplying a carrier-gas and an oxidizing-gas and wherein the data processing unit, when the operation of these gas supply means is initiated, initiates operation of the carrier-gas and oxidizing-gas supply means followed by that of the reducing-gas supply means and, when the operation of these gas supply means is interrupted, interrupts operation of the reducing-gas supply means followed by that of the carrier-gas and oxidizing-gas supply means.

5. The control device according to claim 1, wherein the data processing unit is connected to state sensors and/or to functional actuators of the treatment system in order to allow control/monitoring of the operation of the treatment system.

6. The control device according to claim 5, wherein the data processing unit is connected to state sensors of the gas supply means of the treatment device in order to initiate operation of means for providing an alarm and/or of means for providing an emergency supply of gas in the event of these malfunctioning.

7. The control device according to claim 1, wherein the data processing unit is connected to a center for remote control/monitoring of the processing system via a means for transmission of data.

8. The control device according to claim 1, wherein the data processing unit is connected to at least one man/machine interface.

9. The control device according to claim 1, wherein the datum regarding the speed at which the substrate is running through the treatment device is delivered to the data processing unit by a speed sensor associated with the treatment device.

10. A process for controlling operation of a system for treating a surface of a solid running substrate by dielectric-barrier electrical discharge in a controlled gaseous atmosphere, wherein the system includes a treatment device through which a substrate to be treated runs at a speed, means connected to said treatment device for supplying the treatment device with gas, means for supplying the treatment device with electrical power in order to produce the electrical discharge and means for sucking out the gas, comprising the steps of measuring the speed at which the substrate runs through the device and carrying out the following actions:
   a) upon starting the treatment device and when the running speed of the substrate is greater than a predetermined speed:
      initiating operation of the suction means,
      initiating operation of the gas supply means,
      initiating operation of the electrical power supply means, and
   b) upon stopping the device and/or when the running speed of the substrate drops to a level below a predetermined speed while the substrate is being treated:
      interrupting operation of the electrical power supply means,
      interrupting operation of the gas supply means and,
      interrupting operation of the suction means.

11. The process for controlling operation of a system according to claim 10, wherein, in case a), said actions are carried out in the following chronological order:
   1) initiating operation of the suction means,
   2) initiating operation of the gas supply means,
   3) initiating operation of the electrical power supply means.

12. The process for controlling operation of a system according to claim 10, wherein, in case b) said actions are carried out in the following chronological order:
   1) interrupting operation of the electrical power supply means,
   2) interrupting operation of the gas supply means and
   3) interrupting operation of the suction means.

13. The process for controlling operation of a system according to claim 10, wherein the gas supply means comprise means for supplying a reducing-gas and means for supplying a carrier-gas and an oxidizing-gas and wherein the data processing unit, when the operation of these gas supply means is initiated, initiates the operation of the carrier-gas and oxidizing-gas supply means followed by that of the reducing-gas supply means and, when the operation of these gas supply means is interrupted, interrupts the operation of the reducing-gas supply means followed by that of the carrier-gas and oxidizing-gas supply means.

14. The process for controlling operation of a system according to claim 10, wherein the treatment system is remotely controlled/monitored via a means for transmission of data.

* * * * *